US008612284B1

(12) United States Patent
Sharif et al.

(10) Patent No.: US 8,612,284 B1
(45) Date of Patent: Dec. 17, 2013

(54) QUALITY OF SERVICE DIFFERENTIATED CLOUD STORAGE

(75) Inventors: Amir Sharif, Moscow (RU); Kirill Korotaev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 63 days.

(21) Appl. No.: 13/292,986

(22) Filed: Nov. 9, 2011

(51) Int. Cl.
- G06Q 10/00 (2012.01)
- G06Q 20/00 (2012.01)
- G06F 17/00 (2006.01)
- G06F 7/00 (2006.01)
- G06G 7/00 (2006.01)

(52) U.S. Cl.
USPC ............. 705/7.35; 705/400; 705/80; 707/812

(58) Field of Classification Search
USPC ............................ 705/7.35, 400, 80; 707/812
See application file for complete search history.

(56) References Cited

U.S. PATENT DOCUMENTS

| | | | | |
|---|---|---|---|---|
| 8,285,869 | B1 * | 10/2012 | Graetz | 709/233 |
| 2010/0306379 | A1 * | 12/2010 | Ferris | 709/226 |
| 2010/0332401 | A1 * | 12/2010 | Prahlad et al. | 705/80 |
| 2011/0131335 | A1 * | 6/2011 | Spaltro et al. | 709/228 |
| 2011/0161411 | A1 * | 6/2011 | Rechterman | 709/203 |
| 2011/0170547 | A1 * | 7/2011 | Fein et al. | 370/392 |
| 2011/0211036 | A1 * | 9/2011 | Tran | 348/14.08 |
| 2011/0214011 | A1 * | 9/2011 | Grube et al. | 714/6.22 |
| 2011/0225451 | A1 * | 9/2011 | Leggette et al. | 714/6.22 |
| 2012/0136960 | A1 * | 5/2012 | Liu | 709/217 |
| 2012/0150930 | A1 * | 6/2012 | Jin et al. | 707/827 |
| 2012/0185413 | A1 * | 7/2012 | Felter | 705/400 |

OTHER PUBLICATIONS

Colling, David et al. On Quality of Service Support for Grid Computing. 2nd International Workshop on Distributed Cooperative Laboratories and Instrumenting the GRID (INGRID 2007). Apr. 2007. http://pubs.doc.ic.ac.uk/ingrid-2007/.*
Websters Dictionary. Houghton Mifflin Company. Copyright 1984. p. 726 entry for 'margin'.*
Amazon Simple Storage Service (Amazon S3) website <http://aws.amazon.com/s3/> (<http://web.archive.org/web/20101001011813/http://aws.amazon.com/s3/> on Oct. 1, 2010).*
Amazon Simple Storage Service (Amazon S3) FAQ website <http://aws.amazon.com/s3/faqs/> (<http://web.archive.org/web/20100925010548/http://aws.amazon.com/s3/faqs/> on Sep. 25, 2010).*

* cited by examiner

Primary Examiner — Kevin Flynn
Assistant Examiner — Brian Tallman
(74) Attorney, Agent, or Firm — Bardmesser Law Group (57) ABSTRACT

A system, method and computer program product for managing the quality of service differentiated cloud storage. The cloud storage (and its services) is highly distributed. An overall speed of the storage is calculated based on storage speed and a traffic speed of the connection to the particular cloud storage. Data access expenses are calculated. Then, for each of the portions of the cloud storage the associated speed and traffic costs are calculated, so the user can select a level of data access guarantee (DAG) for his particular needs. In order to maintain the desired overall speed of the data access, geo-targeting with the cloud storage system is implemented, where the same data is retrieved from different locations based on optimal data movement costs.

21 Claims, 6 Drawing Sheets

Geo-targeting

QUALITY OF SERVICE DIFFERENTIATED CLOUD STORAGE

BACKGROUND OF THE INVENTION

1. Field of Invention

The present invention relates to data storage technology and, more particularly, to managing cloud storage based on quality of service and geo-targeting.

2. Background Art

Reliable and efficient storage of data and, in particular, data used by enterprises is becoming increasingly important. Various data duplication, backup and/or data mirroring techniques are used by enterprise data storage systems. Typically, the data is distributed over several data servers, so that a crash of one server or loss of the connection to that server does not affect the data integrity.

In cases of the connection failure between the host and the data server or, if the data server crashes, all data required for user operation has to be restored from some sort of a backup storage. Then, the storage Domain Name Server (DNS) needs to be un-registered with an old host and re-registered with the new host or a shared storage. This is a costly operation that also takes time and resources.

In the context of virtualization, the problem of lost data (such as, for example, Virtual Machine (VM) or server data) that is not effectively recovered can hinder a launch or operation of the replacement VM, which incurs additional expenses. Instead, conventional cloud storages that provide highly distributed data are used in order to provide restoration of missing portions of data.

Conventional method of backup and restore of the data, even if the data is distributed and mirrored (entirely or partially), often do not provide the speed and efficiency of data recovery needed for the enterprise systems. Furthermore, the conventional distributed data systems are expensive in terms of the level redundancy and reliability. Conventional systems that use distributed cloud storages do not allow a user to choose the costs of service that provides a certain level of redundancy and reliability. Typically, these levels are inherent for a particular cloud storage system.

It is desired to have the level or redundancy, the level of reliability and the level of data availability as a single service, so a user can have choices and can select certain guarantees of data availability. The level of redundancy of the cloud storage can be separated from reliability, since redundancy can affects both reliability and availability, if a user constantly moves over the world and uses different segments of the global network. Thus, a data transfer rate can be a function of the "network distance."

Therefore, it is also desired to have a cloud storage system where a user can have the data divided into categories related to guarantee of data availability—cheap, moderate or expensive. Then, the user can pay for a particular level of data service based on the desired guarantee of data availability and speed of data retrieval.

Accordingly, there is a need in the art for an efficient mechanism for maintaining a quality of service differentiated cloud storage.

SUMMARY OF THE INVENTION

The present invention is directed to managing data and optimizing data access by implementing a quality of service differentiated cloud storage that substantially obviates one or several of the disadvantages of the related art.

In one aspect, there is provided a system, method and computer program product for managing the quality of service differentiated cloud storage. The cloud storage (and its services) is highly distributed. An overall speed of the storage is calculated based on storage speed and a traffic speed of the connection to a particular storage. Data access expenses are calculated.

Then, for each of the portions of the cloud storage, the associated speed and traffic costs are calculated, so the user can select a level of data access guarantee (DAG) for his particular needs. Additionally, in order to maintain the desired overall speed of the data access, geo-targeting with the cloud storage system is implemented, where the same data is retrieved from different locations based on optimal data movement costs.

Additional features and advantages of the invention will be set forth in the description that follows. Yet further features and advantages will be apparent to a person skilled in the art based on the description set forth herein or may be learned by practice of the invention.

The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

For purposes of the present discussion, it is assumed that the reader is familiar with highly distributed storage, and cloud storage in particular. The cloud storage can have periodic security updates. Users can have assigned the UIDs. Global namespaces can be used within the cloud storage.

The data is highly distributed within the cloud storage by dividing a file into data chunks. Replicas of the data chunks are created and stored on a plurality of data cloud servers connected to at least one metadata server. The metadata server provides access to the data chunk replicas by a client. Note that the metadata server can use chunks and full replication of data sets, as well. (N,K) algorithms can be used to increase reliability of data storage, as one example. Thus a certain level of redundancy is provided. If a particular data chunk replica is modified on one of the cloud servers, the corresponding replicas are updated on all other cloud servers. If, due to connection failures, some data chunk replicas are not updated, these replicas are marked outdated and a new up-to-date chunk replica is created at a different location on one of the cloud servers.

According to the exemplary embodiment, from the perspective of a user receiving a service (i.e., data access, etc.) and an administrator providing the service, the following criteria related to the cloud storage can be used:

Data access guarantee (DAG);

Level 5 (redundancy is so high, that even the most catastrophic events could not do anything with the data of the cloud storage and the data is almost always available with high access speed;

Level 4 means that the data is always recoverable, but may be unavailable in certain periods of time;

Level 3 means that data or portion of data may be dropped in some case so user should have data backup on his computer or on a local data bank. Live data might be available with high speed.

Level 2 means that portions of data can be dropped, transmitting speed is high. (E.g., dropped frames in low resolution video are not critical.)

Level 1—all data may be dropped (lost) at once and just limited period of storing data is guaranteed. Transmitting speed can be chosen by a user. (E.g., user chooses cloud as a temporary storage for sharing data.);

Storage availability (remote or local).

According to the exemplary embodiment, a user can have some data divided into categories related to DAG (cheap or expensive). The user can select a desired category and pay for the corresponding DAG. For example, an enterprise financial data, digital or other certificates should be always available and well protected. However, the transfer rate is not critical since the volume of such data is not great.

Note that DAG is chosen by a user. The DAG, in general, has two dimensions: speed and reliability. Fast and reliable data storage is the most expensive, while slow and unreliable is the cheapest. The guarantee aspect can include moving a user with data storage or with a part of the data storage. For example, data storage contains six copies. Four of these copies may be stored on reliable servers, one copy follows an estimated position of a user, and one copy moves to the nearest to the user location on a network. All of these data movements are reflected in DAG.

Personal data has more volume and should have higher transfer rate and availability. However, a loss of this data is not as critical. While commercial HD video data can be lost, a transfer rate (criteria) is extremely critical for rendering this data to a user. According to the exemplary embodiment, a user (i.e., consumer) can choose a level of data availability and reliability.

Data redundancy in storage networks is measured by the reliability of storage and network products. Mean time between failure (MTBF) is a definition established by the Storage Network Industry Association (SNIA). MTBF is statistical method for predicting failure rates in a large number of disk drives. Similar methods are used to predict the reliability of all other components in a storage network, including storage controllers and switch-line cards. Another parameter is mean time to loss of data availability (MTDA).

MTDA is a measurement that predicts loss of access to data in a storage network. This measurement includes MTBF calculations for all I/O path components between a host system initiator and a Small Computer Systems Interface (SCSI) logical unit (i.e., such as system interfaces, cables, network devices, subsystem controllers, and interconnect components). Individual storage devices contribute to MTDA, if they are not participating in some sort of a data redundancy scheme.

Another parameter is Mean time to data loss (MTDL). MTDL measures the risk of losing data. Wherever the data redundancy techniques are being used, the data loss results from multiple component failures occurring within a relatively narrow span of time. The whole point of using redundancy techniques with a storage is to increase MTDL to a number that is much, much greater than the MTBF of an individual disk drive. In most cases, MTDL is expressed as the probability of having two components that are part of the same SCSI logical unit failing before a replacement component can take place of the first failed component. Hot-spare technology can increase MTDL considerably by reducing the exposure to a second component failure that would cause permanent data loss.

Yet another standard parameter is mean time to repair (MTTR). MTTR is a measurement of the time it takes to replace a failed component with another fully functioning component. Where disk subsystems are concerned, this means that the subsystem is operating normally and is not operating in reduced or degraded modes. In other words, MTTR includes the time needed to format and copy data to the replacement drives.

The cloud service management system can propose to a user an optimal price plan upon analyzing user metadata and needs of other users. User metadata can be, for example, file names, data indicating how the files are split into chunks (their sizes and IDs) and locations of the chunks (the cloud servers where the chunks are stored). Note that use of chunks can improve reliability.

In other words, a user can choose a speed of data retrieval. A speed of data retrieval is measured in MB per second. The speed is measured from a point of sending the request to completing downloads or uploads. A speed of data retrieval mostly based on a current data transfer speed. If a file has large volume parameter, the retrieval speed is determined by network bandwidth (which generally includes two components—latency and bulk transfer rate—which can be selected by a user). In case of small amount of data, the retrieval speed is based on network distance or ping time.

The user can also choose a level of data importance, reliability (fast and reliable, or slow and unreliable), levels of data replication, etc. According to the exemplary embodiment, the DAG value can be below zero if a group of users chooses community storage. In some instances a user may choose not to transfer data to the cloud storage. In this case the user and administrator mark the file as downloaded.

Then, if the source-file at the location from where the user had downloaded the file is deleted by the owner, the owner is just deleted from the list. The list can be maintained by a cloud administrator, VM monitor, Hypervisor, etc. The principle of sharing files with an identical content is described in co-owned U.S. patent application Ser. No. 13/007,647, filed Jan. 16, 2011, entitled SYSTEM AND METHOD FOR DUPLICATION OF VIRTUAL SERVER FILES.

Figure 1:
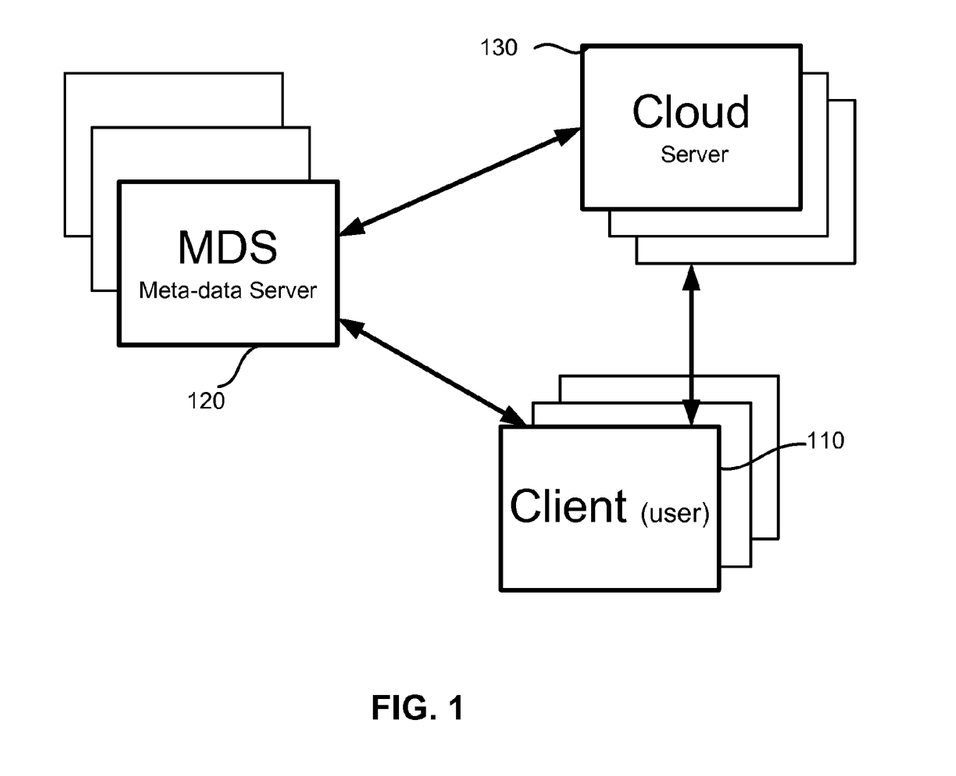
FIG. 1 illustrates a general architecture of a cloud storage system in accordance with the exemplary embodiment.

FIG. 1 illustrates a general architecture of a cloud storage system, in accordance with the exemplary embodiment. A client 110 is a machine that requests data. Clients request user data or data needed to restart failed operations. A cloud server 130 or servers is a simple daemon managing the data chunks on a local disk that services simple user requests (e.g., READ/WRITE requests).

A Metadata Server 120 (or a set of servers with a coherent consistent state across the servers) manages metadata, such as, for example, file names, data indicating how the files are split into chunks (their sizes and IDs) and locations of the chunks (the cloud servers where the chunks are stored). Generally speaking, the MDS 120 keeps track of chunk allocations and replications.

Alternatively, the client (user) 110, the cloud server 130 and the MDS 120 can reside on the same server. According to the exemplary embodiment, a client can create and delete files (i.e., the file names). The client 110 sends a request to the MDS 120. The client 110 can request to open a file by name and to take an exclusive access to this file.

After exclusive access is obtained by the client 110, the client 110 can request access for a particular data file chunk. Client 110 provides a Chunk ID to the MDS 120. The MDS 120 obtains from the CS 130 an I/O map (i.e., a chain or a tree of cloud servers where the redundant chunks reside). Then, the MDS 120 provides a map to the client. Then, the client 110 can use the map for connecting to the cloud server mapped in the map and accessing the required chunk.

Figure 2:
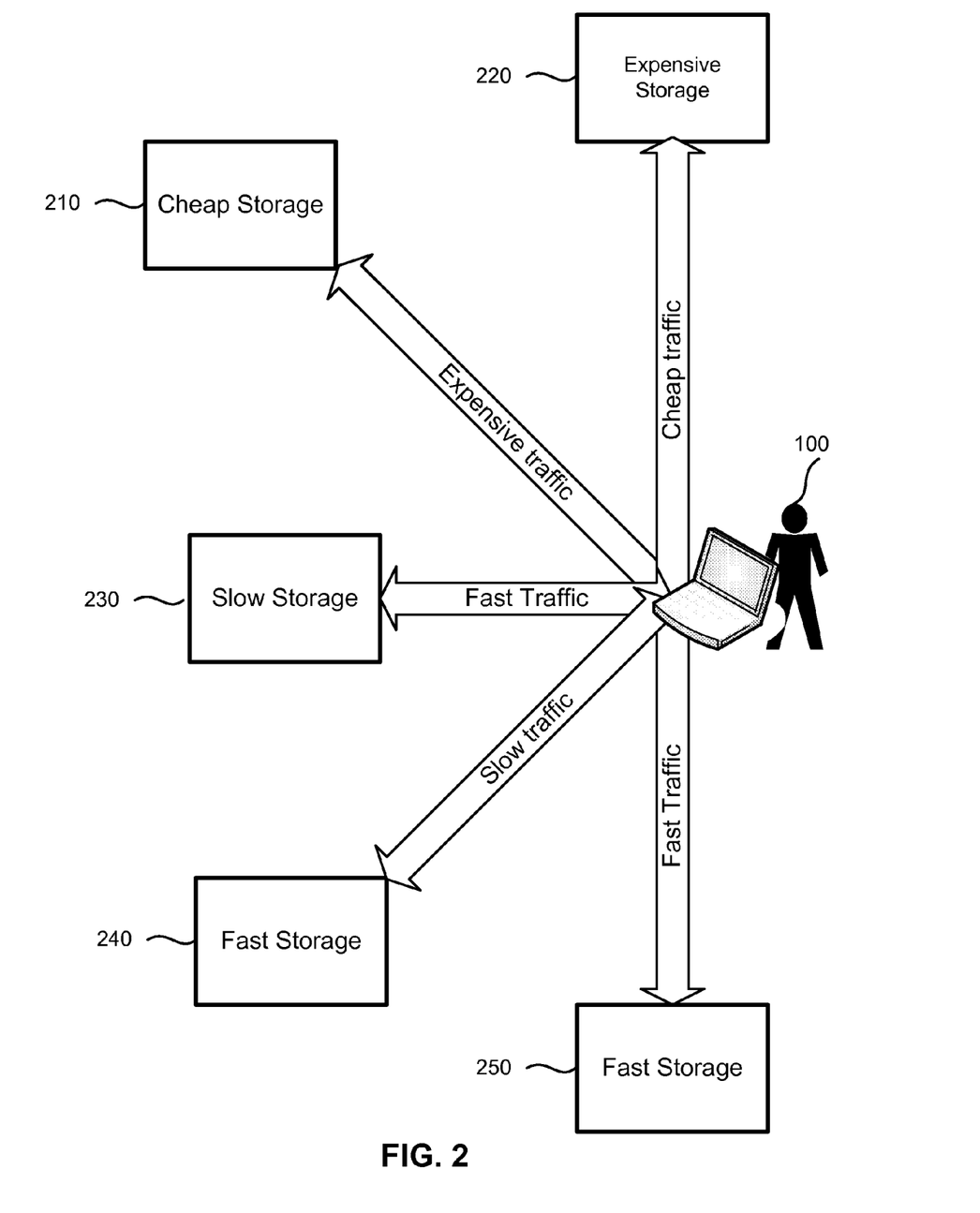
FIG. 2 illustrates how storage speed and price are connected in a cloud storage system.

FIG. 2 illustrates how storage speed and price are related in an exemplary cloud storage system. A user 100 has an option to access different storages. For example, a cheap storage 210 can be accessed via an expensive traffic connection. An expensive storage 220 can be accessed via a cheap traffic connection. A slow storage 230 can be accessed via a fast traffic connection. A fast storage 240 can be accessed via a slow traffic connection. A fast storage 250 can be accessed via a fast traffic connection. Note that the storages are cloud (i.e., distributed) storages.

According to the exemplary embodiment, an overall speed of each cloud storage system is calculated as a product of the storage speed and the traffic speed. The price of data access (i.e., provider expense) is calculated as a product of the storage price and the traffic price. Based on these parameters, the DAG value can be calculated as shown in FIG. 3.

Figure 3:
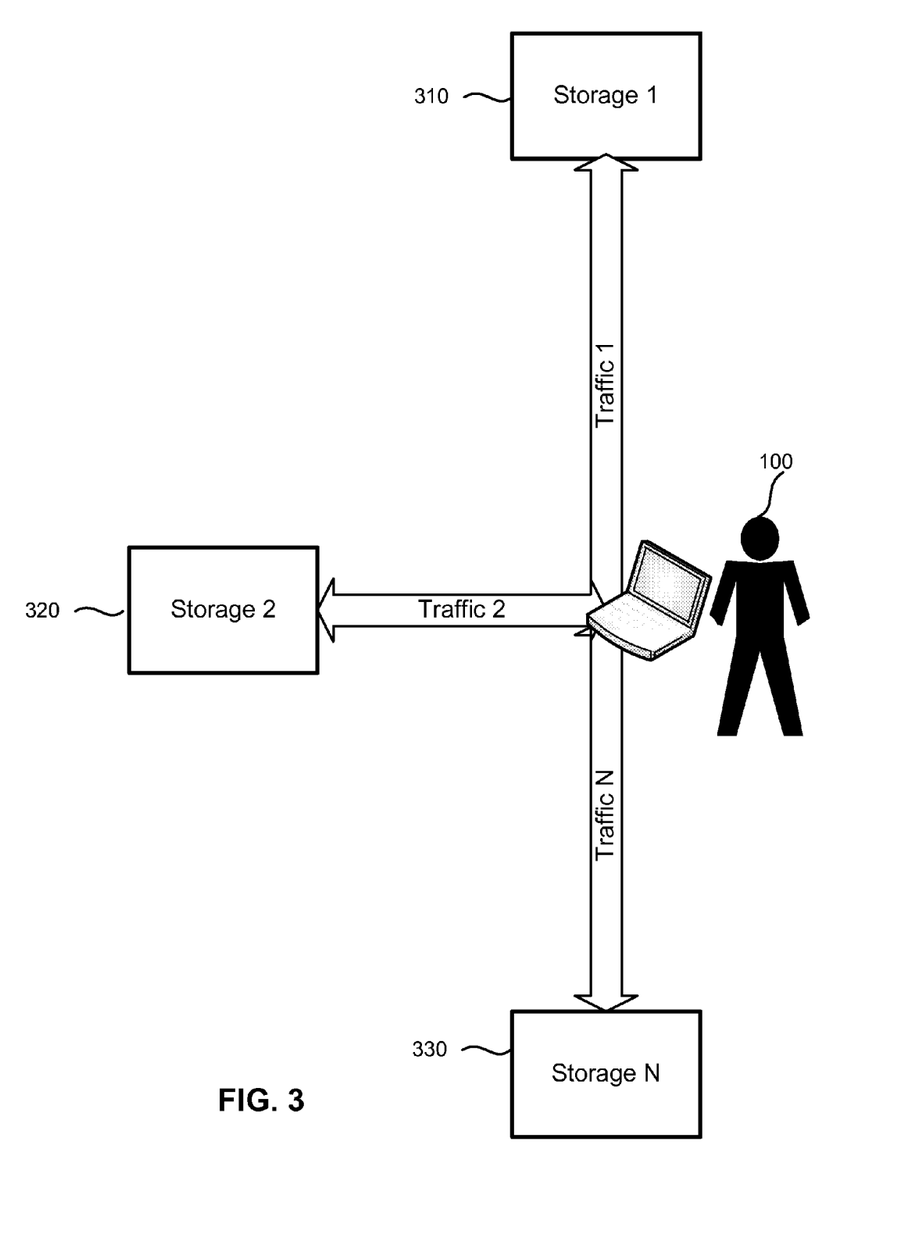
FIG. 3 illustrates overall data access guarantee (DAG) calculation in a cloud storage system.

FIG. 3 illustrates overall data access guarantee (DAG) calculation in a cloud storage system. The user 100 has an option to access different cloud storages—storage 1 (310), storage 2 (320) and storage N (330). Each of the storage has a corresponding traffic speeds and traffic reliability. Then, an overall price (i.e., an overall DAG) is calculated as follows:

DAG=K1*F(Storage N Speed, Traffic N Speed)+K2*G(Storage N Reliability, Traffic N Reliability), where K1 and K2 are empirical constants related to provider tariffs, F( ) and G( ) are functions chosen by provider. N is a number of path (index of a certain path) and storage provided to the user.

In exemplary embodiment DAG=K1*(Storage N Speed)*(Traffic N Speed)+K2*(1−(Storage N Reliability)*(Traffic N Reliability))

Note that multiplication is used as a common function in the exemplary embodiment, since a slow channel prevents a user from using a fast storage. However, if the storage is used by the cloud computational means, its full capabilities can be used. Herein Storage N Speed, Traffic N Speed, Storage N Reliability and Traffic N Reliability are cloud parameters and may have stochastic character or may have a value empirically measured since certain storage may be accessed by number of ways and cloud storage may have networked structure and consist of several physical drives.

In an exemplary embodiment DAG=K1*(Storage N Speed)*(Traffic N Speed)+K2*(1−(Storage N Reliability)*(Traffic N Reliability))

Here: $K1=5*10^{-9}$ USD/(month*MBps$^2$)
$K2=5*10^6$ USD per month
If:
Storage Speed=10 MBps
Traffic Speed=1 MBps
Storage Reliability=0.999999
Traffic Reliability=0.9999
Then DAG expressed in USD per month dimension is 550.

Figure 4:
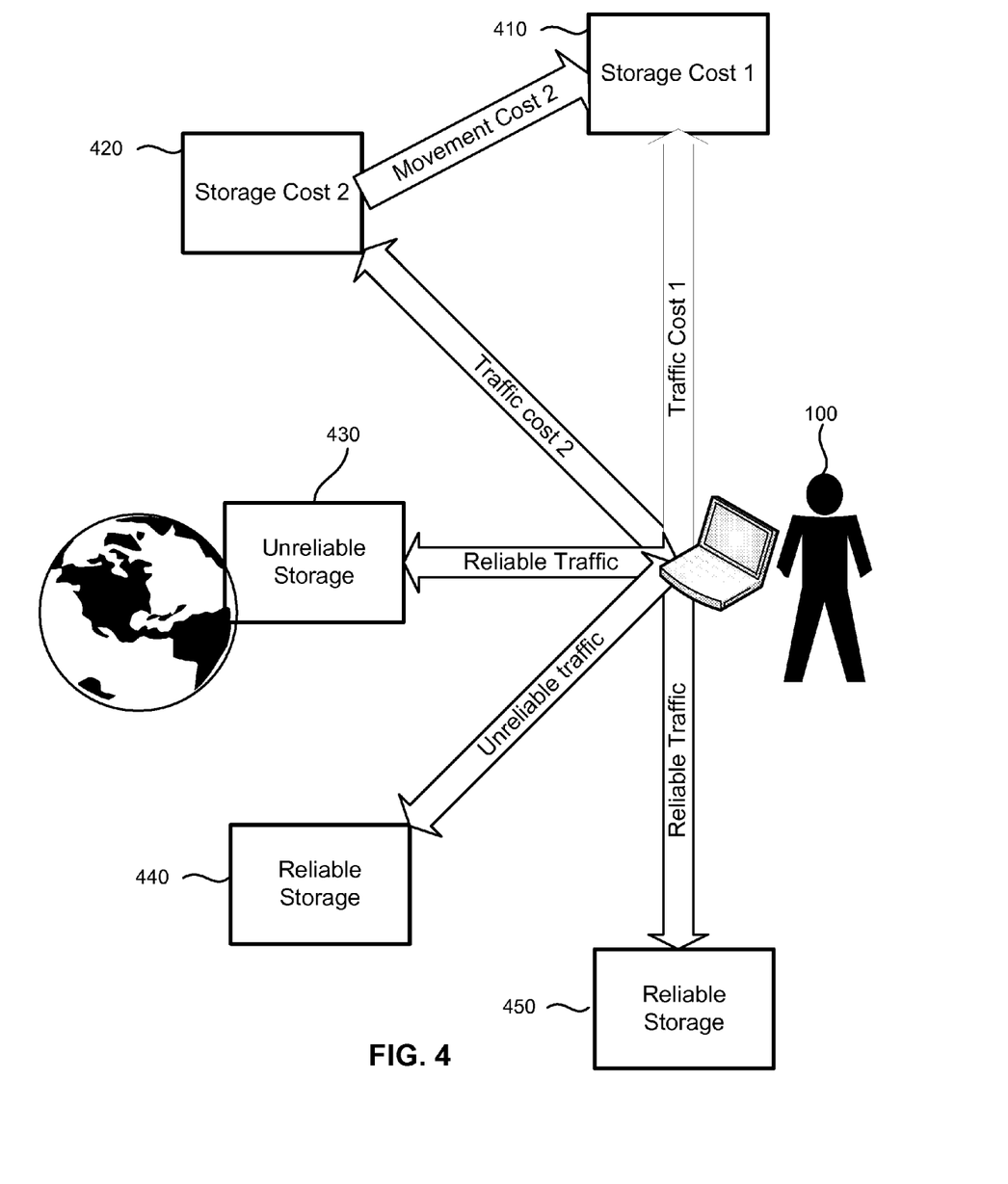
FIG. 4 illustrates calculation of anytime DAG, in accordance with the exemplary embodiment.

FIG. 4 illustrates a calculation of "anytime DAG", in accordance with the exemplary embodiment. A user 100 has an option to access different cloud storages located all over the world. For example, storage 410 has storage cost 1. Note that the costs are defined by the provider. The costs are defined as an overall storage price and a maintenance cost per capacity unit. The costs are measured cents per GB. The cost has a trend to reduce with time. The storage 410 can be accessed via connection with a traffic cost 1.

Storage 420 has storage cost 2. The storage 420 can be accessed via connection with a traffic cost 2. Also the data can be moved from the storage 420 to the storage 410 with movement cost 2. The cost is determined as a traffic cost (e.g., cents per GB).

An unreliable storage 430 can be accessed via a reliable traffic connection and a reliable storage 440 can be accessed via an unreliable traffic connection. A reliable storage 450 can be accessed via a reliable traffic connection. A cloud storage provider profit margin (PM) in this example can be calculated as follows:

PM=(Storage Cost2)*(Traffic Cost2)−(Storage Cost2)*(Traffic Cost2)−Movement Cost 2. The PM is an abstract data used for estimation purposes. An overall cost depends linearly on the amount of stored data and on traffic. The PM is determined by multiplication of price coefficients, if both prices change.

If the PM>0, the cloud storage provider actually has a profit. Otherwise, the provider cannot provide certain services to the user 100.

The anytime DAG is calculated as follows:

Anytime DAG=(Storage Reliability)*(Traffic Reliability)

Note that reliability is multi-dimensional value that depends on probability of failure (1 minus probability of failure). In general, this formula shows possibility of data retrieval over any time period. The Anytime DAG is calculated for a cloud storage where data is duplicated and an overall failure probability of the cloud storage is very low.

Figure 5:
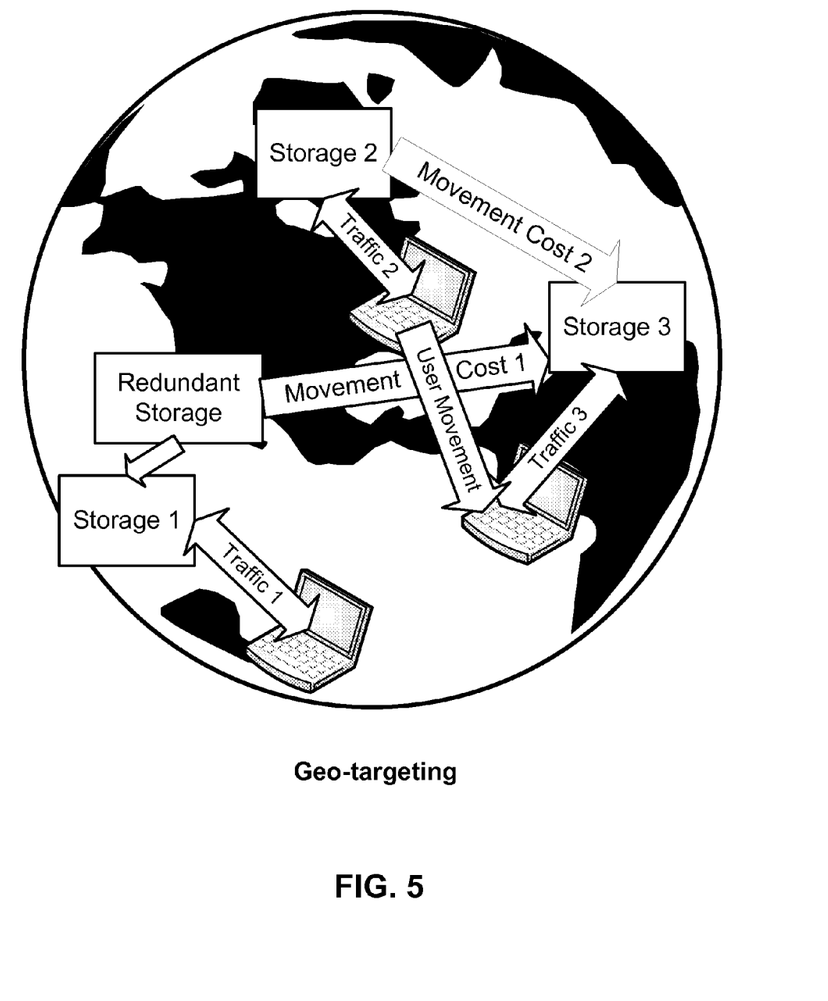
FIG. 5 illustrates geo-targeting in accordance with the exemplary embodiment.

FIG. 5 illustrates geo-targeting in accordance with the exemplary embodiment. Data cloud storages 1, 2 and 3 are located around the world. In this example a redundant storage is provided. A number of users access the cloud storages via different traffic connections. Different data movement costs 1 and 2 (in this example) are associated with moving data from the storage 2 to the storage 3 and the redundant storage to the storage 3.

A user movement cost is associated with moving data from user to another. Note that the user movement is determined by IP address of location of data corresponding to location of a user. The routing of IP packets details is used. In this example, in order to provide a constant value of the product of the Storage Speed and the Traffic Speed, geo-targeting of the cloud storages is implemented. For example, if the Movement Cost 1 of moving the data from the redundant storage to the storage 3 is larger than the Movement Cost 2 of moving the data from the storage 2 to the storage 3, then the data is moved only from the storage 2, thereby using an optimal movement cost.

According to the exemplary embodiment, the cloud storage system analyses all of the movement costs and provides an optimal data movement scenario for a constant value of DAG. This system is fast and reliable. The user pays for data services based on desired data retrieval speed and importance of data. The price of service is advantageously calculated and provided to the user in advance. The user can expect certain data behavior and the level of data integrity.

A cloud storage management system can use data movement patterns typical for a particular user (e.g., e-mails, shared storage usage, etc.) and propose an optimal scenario for the user. According to the exemplary embodiment, a proposed DAG can be system recommended. The DAG can be adjusted by a user according to the required speed and reliability. For example, some enterprise financial data can require speed and reliability. Note that a user can select DAG for certain data by checking boxes next to files or folders.

Storage location is an important issue. A user may choose to move data according to his daily, weekly or season migration. Also, a user can pay for additional data redundancy if his data migration is somewhat chaotic. For example, folder Pictures (on Apple Mac OS) can be very important while My Pictures and My Documents (for MICROSOFT WINDOWS) can be less important. A cloud management system can divide data for achieving an optimal price. A user can propose a total budget for services.

Thus, the proposed system is budget driven and optimized according to user preferences. According to the exemplary embodiment, a service provider can establish user correspondence using a predictable algorithm. The service and application for service can reside in the cloud transparently to the user. For example, if one storage server fails, the corresponding application restores levels of redundancy by copying data from available servers. Thus, a constant redundancy level is maintained. The level of redundancy is determined based on network segment communications.

A loss of a file record can be a local network problem. Meanwhile, complete disappearance of an entire data center can be a result of a global fault. Prediction of data migration can have common rules (e.g., at Christmas or over the holidays people are more active). The level of redundancy with the clouds system is set in consideration to overall storage needs and bandwidth availability. The proposed system balances performance and required storage size, thereby improving cost effectiveness.

The response time can be different depending on location. According to the exemplary embodiment, the non-redundant data is moved closer to the user. A reasonable distance can be chosen to improve cost effectiveness. For example, e-mails can be stored close to the user. If small amounts of data (e.g., database records) are retrieved by user constantly, the network distance should be small to provide the user with reliable service (for example, if a user is a stock trader). If a user loads data once a day (e.g., not urgent mail), the network distance and channel reliability is not critical. Storage reliability is the main issue in this case.

Retrace technology can improve availability and fault tolerance from the view of the user. Retrace technology means that user's location is monitored, and some user's data follows the user. For example, certain data storage has a constant availability level, but the user periodically moves to a network segment isolated from this storage. During a work day and a week, the data can be moved to a different location in order to reduce traffic and increase security, as well as improve overall data retrieval speed.

This process can be viewed as part geo-targeting discussed above. In the exemplary embodiment, the level of redundancy can be separated from reliability. For example, if redundant segments (i.e., IP domains, local networks, servers and routers related to different providers) are located in the same segment of the network, the redundancy may not increase data availability, if the entire segment of the network becomes unavailable to the user.

At the same time, a redundant data chunk placed onto an unreliable, but closest to the user, server could reduce the overall reliability. Thus, redundancy may have an effect on both reliability and availability, if the user constantly moves over the world and uses different segments of the global network.

According to the exemplary embodiment, the data transfer rate is a function of the "network distance" (i.e., a response time). Note that the cloud service can include normal operations and error work (that can take a long time). Error handling is performed as follows. If channels and servers fail, the data is moved to the most secure locations, bypassing the traffic by path optimization.

The cloud services are highly distributed and need periodic security updates. A user of the cloud can have UID that is global for the entire cloud service or global to certain portions of the cloud service. Global Namespace can be used within the cloud storage. Each mail address is unique and each user is assigned at least one unique ID.

Figure 6:
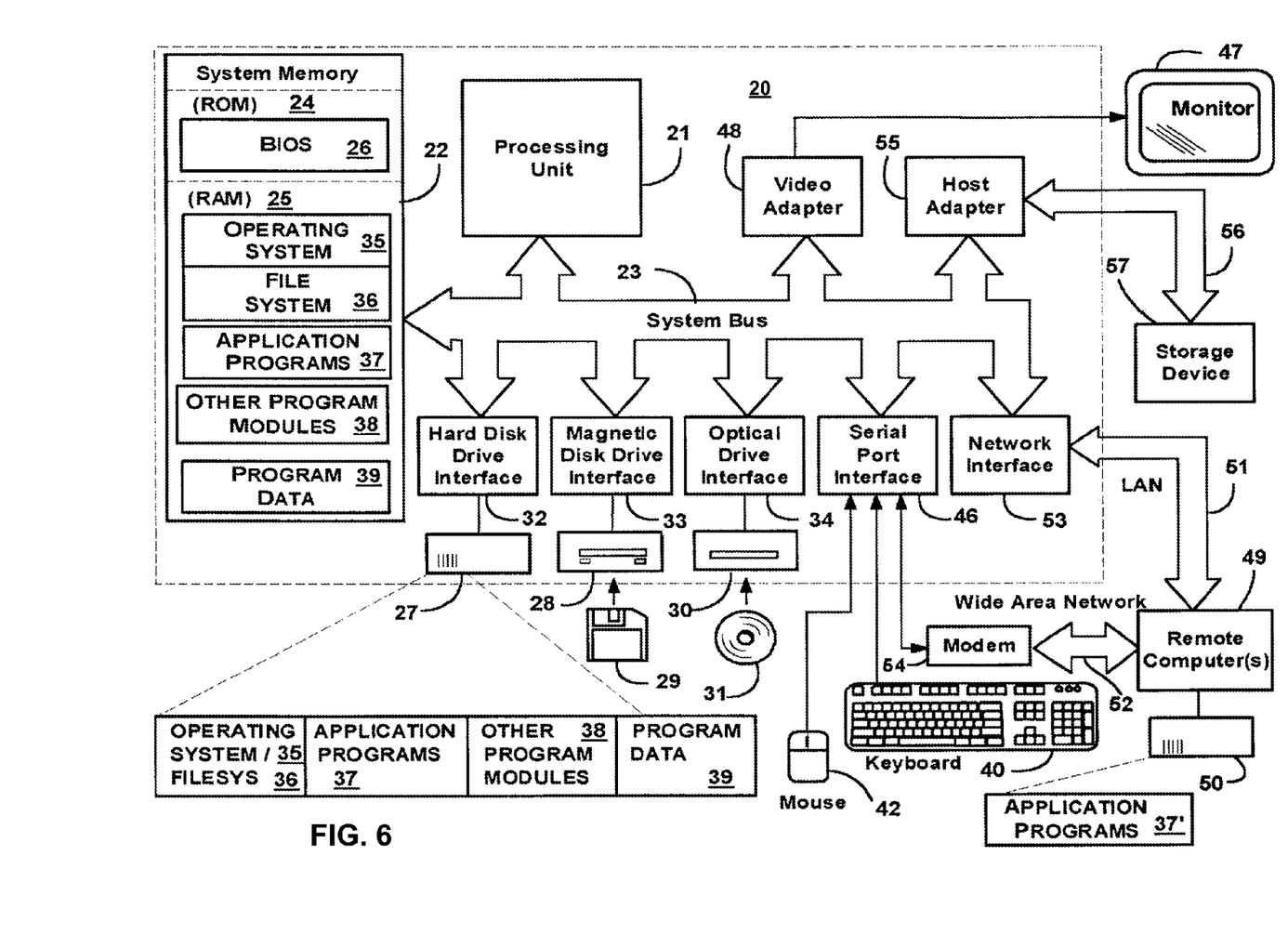
FIG. 6 illustrates an exemplary computer system where the embodiments described herein can be implemented.

With reference to FIG. 6, an exemplary system for implementing the invention includes a general purpose computing device in the form of a computer or data servers 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer/server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for managing cloud storage based on quality of service, comprising:
   a data file divided into data chunks;
   a plurality of cloud storage devices configured to store geographically distributed replicas of the data chunks in a continuous manner, wherein the cloud storage devices are further configured to be accessed by client machines via plurality of connections having traffic differentiated by speed and price, and wherein the cloud storage devices are further configured to be differentiated by price and speed of data retrieval of hardware storage elements of the cloud storage devices,
   and wherein the cloud storage devices are further configured to be controlled by storage plan parameters, wherein the storage plan parameters include an overall speed of data retrieval,
   wherein the overall speed of data retrieval is a product of storage data retrieval speed and traffic speed of a corresponding connection between a client machine and one of the cloud storage devices, and wherein a data access guarantee (DAG) is based on the overall speed of data retrieval, requiring at least some client's data to move from one cloud storage device to a closer cloud storage device as the client machine moves geographically,
   wherein the storage plan parameters for speed, reliability and price are based on information provided to the client machine by the system,
   wherein the DAG is calculated as K1*(cloud storage device speed)*(traffic connection speed)+K2*(1−(cloud storage device reliability)*(traffic connection reliability)), K1 and K2 being constants, and
   wherein the storage plan parameters are dynamically configurable at runtime by the client machine.

2. The system of claim 1, wherein the storage plan parameters include a price of data access, wherein the price of data access is based on a cloud storage price multiplied by a corresponding connection traffic price.

3. The system of claim 1, wherein the storage plan parameters include a price of data access, wherein the price of data access is based on reliability values of each cloud storage device and a corresponding client machine connection.

4. The system of claim 1, further comprising a plurality of metadata servers (MDSs) configured to provide metadata required to access data within the cloud storage devices.

5. The system of claim 4, wherein the metadata provided by the MDSs includes any of:
   file name;
   data indicating how the files are split into the data chunks;
   data chunk residence cloud server;
   data chunk size; and
   data chunk location.

6. A method for managing cloud storage based on quality of service, the method comprising:
   creating a plurality of interconnected cloud storage devices;
   creating at least one redundant storage to continuously store data replicas;
   determining a speed of hardware storage elements for each of the cloud storage devices;
   measuring connection traffic speed;
   on a server device, calculating prices of the cloud storage devices based on the speed of data retrieval from the hardware storage elements and connection traffic speed;
   estimating reliability of the cloud storage devices;
   calculating anytime data access guarantee (DAG) based on the cloud storage device reliability and traffic connection reliability;
   calculating costs of moving data between the cloud storage devices and the redundant storage to achieve a calculated DAG; and
   transmitting to a client machine, over a network, a least expensive cost of moving the data to a geographic location closer to the client machine,
   wherein the DAG is calculated as K1*(cloud storage device speed)*(traffic connection speed)+K2*(1−(cloud storage device reliability)*(traffic connection reliability)), K1 and K2 being constants.

7. The method of claim 6, wherein a client selects desired cloud service based on the DAG.

8. The method of claim 6, further comprising: holding the cloud storage device speed multiplied by the connection traffic speed to a constant value.

9. The method of claim 6 further comprising: determining whether a cloud service provider has a positive margin when the costs of moving data between the cloud storage devices and the redundant storage are larger than zero.

10. The method of claim 6, wherein the cloud storage devices are located in distributed geographic locations.

11. The method of claim 10 further comprising: optimizing the costs of moving data between the cloud storage devices and the redundant storage providing efficient geo-targeting of data.

12. The method of claim 6 further comprising: optimizing the costs of moving data between the cloud storage devices and the redundant storage providing optimization of network.

13. The method of claim 6 further comprising: optimizing the costs of moving data between the cloud storage devices and the redundant storage providing optimization of bulk transfer rate.

14. A system for managing cloud storage based on quality of service, the system comprising:
- a processor;
- a memory coupled to the processor;
- a computer program logic stored in the memory and executed on the processor, the computer program logic implementing the steps of:
  creating a plurality of interconnected cloud storage devices;
  creating at least one redundant storage for continuously storing data replicas;
  determining a speed of hardware storage elements for each of the cloud storage devices;
  measuring connection traffic speed;
  calculating prices of the cloud storage devices based on the speed of data retrieval from the hardware storage elements and connection traffic speed;
  estimating reliability of the cloud storage devices;
  calculating anytime data access guarantee (DAG) based on the cloud storage device reliability and traffic connection reliability;
  calculating costs of moving data between the cloud storage devices and the redundant storage for a calculated DAG; and
  transmitting to a client machine, over a network, a least expensive cost of moving the data to a geographic location closer to the client machine,
wherein the DAG is calculated as K1*(cloud storage device speed)*(traffic connection speed)+K2*(1−(cloud storage device reliability)*(traffic connection reliability)), K1 and K2 being constants.

15. A system for managing cloud storage based on data access guarantees (DAG), comprising:
a plurality of cloud storage devices in a cloud configured to store geographically distributed data, using redundancy and continuous replication, wherein the cloud storage devices are further configured to be accessed by client computers via plurality of connections, and wherein the client computers are geographically distributed and move geographically over time,
wherein the cloud storage devices are further configured to have speed of data retrieval parameters of hardware storage elements of the cloud storage devices and storage reliability parameters, and the plurality of connections have data transmission speed and access reliability parameters,
wherein the cloud storage devices are further configured to be controlled by storage plan parameters, wherein the storage plan parameters are part of a proposed storage plan of a plurality of storage plans, wherein the proposed storage plan includes an estimated cost value based on allocation of the cloud storage devices and speed of transmitting channels from the cloud storage devices to a client computer,
wherein the proposed storage plan includes DAG, wherein the DAG include criteria of at least the speed of data retrieval parameters, the data transmission speed parameters and the access reliability parameters for each session when the client computer accesses its data on the cloud,
wherein the DAG is based on a level of the geographical distribution of cloud storage device locations of replicated data,
wherein the DAG corresponding to the proposed storage plan is dynamically alterable, and the system provides dynamic redistribution of client data inside a cloud to different storage devices as the client computer's geographic location changes, to satisfy the DAG,
and wherein the DAG is calculated as K1*(cloud storage device speed)*(traffic connection speed)+K2*(1−(cloud storage device reliability)*(traffic connection reliability)), K1 and K2 being constants.

16. The system of claim 15, wherein at least one of the following are configured to geographically redundantly distribute the data to achieve the level of the geographical distribution:
different servers;
different server racks; and
different stand of racks of servers.

17. The system of claim 15, wherein at least one of the following are configured to geographically redundantly distribute the data to achieve the level of the geographical distribution:
different halls in a data center; and
different server centers in a single building.

18. The system of claim 15, wherein at least one of the following are configured to geographically redundantly distribute the data to achieve the level of the geographical distribution:
different server centers in the same country; and
different server centers in different countries.

19. The system of claim 15, wherein the data includes financial data.

20. The system of claim 19, wherein the DAG is based on the financial data including highest available reliability parameters with the financial data.

21. The system of claim 15, wherein the data includes entertainment data, wherein the DAG is based on the entertainment data including highest available data transmission speed parameters with the entertainment data.

* * * * *